United States Patent
Maurer, Jr. et al.

(10) Patent No.: US 6,560,354 B1
(45) Date of Patent: May 6, 2003

(54) APPARATUS AND METHOD FOR REGISTRATION OF IMAGES TO PHYSICAL SPACE USING A WEIGHTED COMBINATION OF POINTS AND SURFACES

(75) Inventors: Calvin R. Maurer, Jr., Rochester, NY (US); Robert J. Maciunas, Pittsford, NY (US); J. Michael Fitzpatrick, Nashville, TN (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 09/250,267

(22) Filed: Feb. 16, 1999

(51) Int. Cl.⁷ ................................................. G06K 9/00
(52) U.S. Cl. .................... 382/131; 128/922; 378/21; 378/62; 382/132; 382/173; 600/414; 600/424; 600/426
(58) Field of Search ................................. 382/131–132, 382/145, 174; 378/65, 207; 600/410, 424–426; 128/922

(56) References Cited

U.S. PATENT DOCUMENTS

| | | |
|---|---|---|
| 4,945,914 A | 8/1990 | Allen |
| 4,977,505 A | 12/1990 | Pelizzari et al. |
| 4,991,579 A | 2/1991 | Allen |
| 5,016,639 A | 5/1991 | Allen |
| 5,094,241 A | 3/1992 | Allen |
| 5,097,839 A | 3/1992 | Allen |
| 5,119,817 A | 6/1992 | Allen |
| 5,142,930 A | 9/1992 | Allen et al. |
| 5,178,164 A | 1/1993 | Allen |
| 5,211,164 A | 5/1993 | Allen |
| 5,222,499 A | 6/1993 | Allen et al. |
| 5,230,338 A | 7/1993 | Allen et al. |
| 5,361,763 A * | 11/1994 | Kao et al. .................... 600/410 |
| 5,397,329 A | 3/1995 | Allen |
| 5,429,134 A * | 7/1995 | Foo ............................. 600/413 |
| 5,568,384 A * | 10/1996 | Robb et al. .................. 707/532 |
| 5,590,215 A | 12/1996 | Allen |
| 5,778,043 A * | 7/1998 | Cosman ........................ 378/65 |
| 5,951,475 A * | 9/1999 | Gueziec et al. ............. 600/425 |
| 5,999,840 A * | 12/1999 | Grimson et al. ............ 600/424 |
| 6,096,050 A * | 8/2000 | Audette ....................... 606/130 |
| 6,144,759 A * | 11/2000 | Weese et al. ............... 382/132 |
| 6,205,411 B1 * | 3/2001 | DiGioia, III et al. ......... 703/11 |

OTHER PUBLICATIONS

KS Arun, TS Huang, SD Blostein. Least-squares fitting of two 3–D point sets. *IEEE Transactions on Pattern Analysis and Machine Intelligence*, 9: 698–700, Sep. 1987.

PJ Besl, NC McKay. A method of registraction of 3–D shapes. *IEEE Transactions on Pattern Analysis and Machine Intelligence*, 14: 239–256, Feb. 1992.

(List continued on next page.)

*Primary Examiner*—Bhavesh Mehta
*Assistant Examiner*—Gregory Desire
(74) *Attorney, Agent, or Firm*—Blank Rome, LLP (57) ABSTRACT

An image of a patient taken through X-ray computed tomography or the like is registered to physical measurements taken on the patient's body. Different parts of the patient's body are given different numerical weights; for example, if bone measurements are deemed to be more accurate than skin measurements, the bones can be given a higher weight than the skin. The weights are used in an iterative registration process to determine a rigid body transformation function. The transformation function is used in robot-assisted surgical procedures, stereotactic procedures or the like.

32 Claims, 5 Drawing Sheets

OTHER PUBLICATIONS

CR Maurer Jr., GB Aboutanos, BM Dawant, RJ Maciunas, JM Fitzpatrick. Registration of CT and MR brain images using a combination of points and surfaces. *Medical Imaging 1995: Image Processing,* Proc. SPIE 2434: 109–123, 1995.

CR Maurer Jr., GB Aboutanos, BM Dawant, RJ Maciunas, JM Fitzpatrick. Registration of 3–D images using weighted geometrical features. *IEEE Transactions on Medical Imaging,* 15: 836–849, Dec. 1996.

CR Maurer Jr., RJ Maciunas, JM Fitzpatrick. Registration of head CT images to physical space using multiple geometrical features. *Medical Imaging 1998: Image Processing,* Proc. SPIE 3338: 72–80, 1998.

CR Maurer Jr., RJ Maciunas, JM Fitzpatrick. Registration of head CT images to physical space using a weighted combination of points and surfaces. *IEEE Transactions on Medical Imaging,* 17: 753–761, Oct. 1998.

CR Meyer, GS Leichtman, JA Brunberg, RL Wahl, LE Quint. Simultaneous usage of homologous points, lines, and planes for optimal, 3–D, liner registration of multimodallity imaging data. *IEEE Transactions on Medical Imaging,* 14: 1–11, Mar. 1995.

* cited by examiner

APPARATUS AND METHOD FOR REGISTRATION OF IMAGES TO PHYSICAL SPACE USING A WEIGHTED COMBINATION OF POINTS AND SURFACES

BACKGROUND OF THE INVENTION

The present invention is directed to an apparatus and method for the registration of images to physical space by the use of a weighted combination of points and surfaces. The present invention is more particularly directed to the registration of images of patients' body parts to the actual patients' body parts for surgery although it is applicable to any use in which a geometrical transformation represents rigid-body motion or approximate rigid-body motion. Such images can be taken by X-ray computed tomography (CT) or the like.

Registration is the determination of a one-to-one mapping or transformation between the coordinates in one space and those in another such that points in the two spaces that correspond to the same anatomic point are mapped to each other. Registration of multimodal images makes it possible to combine different types of structural information [such as X-ray computed tomography (CT) and magnetic resonance (MR) images] and functional information [such as positron emission tomography (PET) and single photon emission tomography (SPECT)] for diagnosis and surgical planning. Registration of images acquired with the same modality at different times allows quantitative comparison of serial data for longitudinal monitoring of disease progression/regression and postoperative follow up.

Registration of preoperative images with the physical space occupied by the patient during surgery is a fundamental step in interactive, image-guided surgery techniques. Surgical navigation systems use the image-to-physical transformation to track in real time the changing position of a surgical probe on a display of the preoperative images. Stereotactic procedures use the transformation to direct a needle (stereotactic biopsy) or energy (stereotactic radiosurgery) to a surgical target (e.g., tumor) located in the images.

Many methods have been used to register medical images. Image-guided stereotactic surgical procedures have been performed since the early 1970's using stereotactic frame systems. Such systems generally include a reference frame that provides rigid skull fixation using pins or screws and establishes a stereotactic coordinate system in physical space, a method for stereotactic image acquisition, and a system for mechanical direction of a probe or other surgical instrument to a defined intracranial point. Most current systems relate image space to the physical coordinate space established by the reference frame by attaching a localizing system consisting of N-shaped fiducials during image acquisition. Frames permit neurosurgeons to perform biopsies and to resect deep-seated and previously inaccessible lesions.

Frame-based techniques, however, have several limitations. The frames are bulky and may interfere with the surgical exposure. Patients complain about the weight of the frame and the pain associated with its application. The surgeon is typically limited to target points on a linear trajectory. Perhaps most importantly, frame-based stereotactic systems do not provide real-time feedback to the surgeon about anatomic structures encountered in the surgical field.

To address such limitations, a number of frameless stereotactic systems have been developed over the last decade. Of the many frameless methods that have been used to register medical images, it appears that point-based and surface-based techniques are the most useful for image-to-physical registration. There is mounting evidence that voxel-intensity-based methods might be the easiest and most accurate way to perform mono- and multi-modality image-to-image registration, but their use for image-to-physical registration is probably rather limited until higher quality three-dimensional (3-D) intraoperative images become readily available. Point-based registration involves determining the coordinates of corresponding points in different images and/or physical space and computing the geometrical transformation that best aligns those points, generally in a least-squares sense. Many investigators have performed point-based image-to-physical registration using external anatomic landmarks (e.g., internal and external canthi, nasion), skin-affixed markers, or bone-implanted markers; a recent survey cites more than 70 publications devoted to point-based registration. Surface-based registration involves determining corresponding surfaces in different images and/or physical space and computing the geometrical transformation that best matches those surfaces. Researchers have performed surface-based image-to-physical registration using the skin or the outer skull surface. Points and surfaces can be easily and accurately acquired in physical space using 3-D probes (e.g., articulated mechanical, electromagnetic, ultrasonic, optical), stereo video cameras, and/or laser range-finders.

Most previously reported registration techniques that align three-dimensional (3-D) image volumes by matching geometrical features such as points, curves, or surfaces use a single type of feature. Patents have been issued for the idea of point-based registration using bone-implanted markers (e.g., G. S. Allen, "Method and Apparatus for Imaging the Anatomy," U.S. Pat. No. 5,016,639, May 1991) and surface-based registration (e.g., C. A. Pelizzari and G. T. Y. Chen, "Means to Correlate Images from Scans Taken at Different Times Including Means to Determine the Minimum Distances between a Patient Anatomical Contour and a Correlating Surface," U.S. Pat. No. 4,977,505, December 1990). An example of a surface commonly used for registration is the skin-air interface.

A technique has been developed to use multiple features simultaneously (C. R. Meyer, G. S. Leichtman, J. A. Brunberg, R. L. Wahl, and L. E. Quint, "Simultaneous usage of homologous points, lines, and planes for optimal, 3-D, linear registration of multimodality imaging data," *IEEE Transactions on Medical Imaging*, 14: 1–11, 1995). However, that method uses points, lines, and planes and is accordingly less general and less useful than is desired, since lines are special cases of curves and planes are special cases of surfaces.

SUMMARY OF THE INVENTION

It will be readily apparent from the above discussion that a need still exists in the art for a method and apparatus for 3-D image registration that provides high accuracy while minimizing the need for invasive techniques and other sources of patient discomfort.

Accordingly, it is an object of the invention to allow accurate 3-D image registration without the need for frames and with only minimal need for markers.

Another object of the invention is to allow 3-D image registration using a combination of points and surfaces.

Yet another object of the invention is to allow 3-D image registration which is not limited to points, lines and planes.

Still another object of the invention is to allow 3-D image registration through weighting of the various features to be registered.

A still further object of the invention is to allow 3-D image registration while avoiding the above-noted deficiencies in the prior art.

To achieve the above and other objects, the present claimed invention is directed to a 3-D image registration method that uses a weighted combination of multiple geometrical features simultaneously. The method uses an algorithm, called a weighted geometrical feature (WGF) registration algorithm, which has the capability of using points, curves (e.g., line segment sets), and surfaces (e.g., triangle sets). The result of the registration is a transformation function which is used in guiding surgical operations. The present invention is further directed to an apparatus for carrying out the algorithm and performing the surgical operations in accordance with the transformation function.

The main idea of the present invention can be summarized briefly as follows:

1) If extrinsic markers (e.g., skin-affixed or bone-implanted markers) are to be used for registration, first attach such markers to the patient in the region of the anatomy to be imaged and registered.
2) Acquire a 3-D image (e.g., CT, MR, PET, SPECT) of the patient.
3) Segment the geometrical features to be used for registration using standard segmentation techniques.
4) Acquire positional information of geometrical features corresponding to those segmented in the above step using 3-D probes (e.g., articulated mechanical, electromagnetic, ultrasonic, optical), stereo video cameras, and/or laser range-finders.
5) Assign weights to the segmented geometrical features.
6) Register the first image with physical space (image-to-physical registration, or IP registration) using the weighted geometrical feature (WGF) registration algorithm.
7) The transformation can be used for various purposes, e.g., tracking the changing position of a surgical probe on a display of the preoperative images, or directing a needle (stereotactic biopsy) or energy (stereotactic radiosurgery) to a surgical target (e.g., tumor) located in the images.

There are two important ideas in the present invention. First, different weights can be assigned to different points or different regions of a surface. That can be done using the present invention with one or more types of geometrical features. For example, the present invention can be used to perform point-based registration, as the WGF algorithm handles point-based and surface-based registration as degenerate cases. Whereas all published work of which Applicants are aware weights all points equally, the present invention allows the user to assign different weights to different points. If each point has a measurement error that is independently random and normally distributed around the true position, then the maximum likelihood estimate of the transformation parameters is obtained by weighting the ith point by $1/\sigma_i^2$, where $\sigma_i^2$, is the variance of the measurement error of the ith point. In other words, points which are more accurately measured (smaller $\sigma_i^2$) are weighted more heavily (larger $1/\sigma_i^2$). Similarly, the present invention can be used to perform surface-based registration. It might be possible to increase the accuracy of such registration by weighting surface points using information such as estimated surface point measurement error, surface model segmentation error, and surface curvature.

The second important idea is that registration can be performed using multiple geometrical features simultaneously. That idea has two potential advantages. First, point-based registration requires a minimum of three non-colinear points. The position of a bone-implanted marker can be determined more accurately than that of a skin-affixed marker or an anatomic point landmark. The major disadvantage of using bone-implanted markers is that an invasive procedure is required to implant each marker. By combining surface information, the present invention allows registration to be performed using only one or two markers. Second, a combination of geometrical features can improve both the accuracy and reproducibility of registration. For example, intraoperative surface information is sometimes restricted to a small patch due to surgical conditions (e.g., surgical drapes). Surface-based registration using limited surface information is almost certainly not very accurate. The WGF algorithm can be used to improve registration accuracy in such circumstances by incorporating a single point (in that case a bone-implanted marker, but potentially an anatomical landmark or skin-affixed marker) that effectively serves as an "anchor."

As mentioned previously, there is mounting evidence that voxel-intensity-based methods might be the easiest and most accurate way to perform both mono- and multi-modality image-to-image registration. However, their use for image-to-physical registration is probably rather limited until higher quality 3-D intraoperative images become readily available. Thus, for at least the next decade, it is believed that image-to-physical registration will be based on geometrical features such as points and surfaces. Points and surfaces can be easily and accurately acquired in physical space using 3-D probes (e.g., articulated mechanical, electromagnetic, ultrasonic, optical), stereo video cameras, and/or laser range-finders. All image-to-physical registration work of which Applicants are aware has used exclusively points or surfaces.

The WGF registration algorithm, which not only allows the combination of multiple types of geometrical information but also handles point-based and surface-based registration as degenerate cases, could form the foundation of a "flexible" surgical navigation system that allows the surgeon to use what he considers the method most appropriate for an individual clinical situation. For example, if a neurosurgeon wants to remove a superficial meningioma and decides that a 95% TRE (target registration error) of 5–6 mm is sufficient for his operation, he might choose to do a surface-based registration using the skin. If he decides that he needs additional accuracy, he might initially collect skin surface points, perform a skin surface-based registration, use that registration to make a skin flap, collect surface points over the skull that is exposed after making the skin flap, perform a bone-and-skin surface-based registration, and use that more accurate registration to elevate the craniotomy and perform surgery. The present invention would allow the surgeon to also use one or more anatomic landmarks and/or bone-implanted markers in a bone-skin-and-marker registration. In circumstances where the best possible accuracy is required, as may be the case for skull-base surgery performed using an operating microscope with video overlays containing information derived from preoperative images, three or more bone-implanted markers could be used, possibly in combination with the skull surface.

An algorithm has been developed, implemented, and tested. Its usefulness has been demonstrated by using it to perform both image-to-image (CT-MR) and image-to-physical (CT-physical space) registration of head images. Weighting different regions of a surface can improve the accuracy of surface-based registration. Registration using points and a surface can be significantly more accurate than registration using points or a surface.

While a preferred embodiment will be set forth with respect to registration of patients' heads to the actual patients' heads for surgery, the invention should not be construed as limited only to that use. For example, rigid-body transformations are also useful in spinal surgery and in orthopedic surgery. Even soft tissues may be sufficiently rigid for the present invention to be used. While the liver is not a rigid structure, liver motion during breathing is often approximately rigid (cranial-caudal translation) and may be sufficiently rigid for a radiosurgery application. For that matter, the present invention can be applied to any surgical or non-surgical use in which a geometrical transformation represents rigid-body motion, exactly or approximately.

Various aspects of the present invention have been described in the following publications, whose disclosures are hereby incorporated by reference in their entireties into the present disclosure:

C. R. Maurer, Jr. et al, "Registration of CT and MR brain images using a combination of points and surfaces," *Medical Imaging* 1995: *Image Processing*, Proc. SPIE 2434: 109–123, 1995;

C. R. Maurer, Jr. et al, "A method for registration of 3-D images using multiple geometrical features," *IEEE Transactions on Medical Imaging*, 15: 836–849, 1996;

C. R. Maurer, Jr. et al, "Registration of head CT images to physical space using multiple geometrical features," *Medical Imaging* 1998: *Image-Processing*, Proc. SPIE 3338: 72–80, 1998; and C. R. Maurer, Jr. et al, "Registration of head CT images to physical space using a combination of points and surfaces," *IEEE Transactions on Medical Imaging*, 17: 753–761, 1998.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

A preferred embodiment of the present invention will be set forth in detail with reference to the drawings, in which like reference numerals designate like components throughout.

Figure 1:
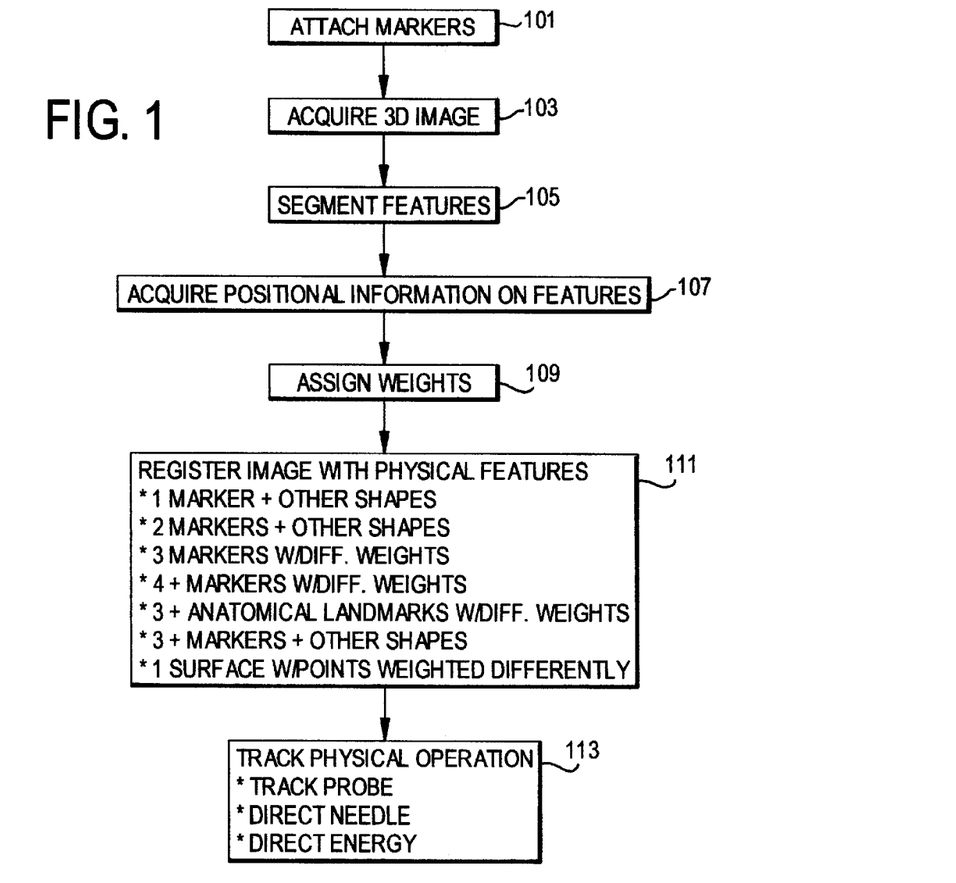
FIG. 1 shows a flow chart of operations performed in carrying out the registration according to a preferred embodiment of the present invention.

FIG. 1 is a flow chart showing an overview of operations to be performed according to the preferred embodiment. At step 101, if one or more extrinsic markers (e.g., skin-affixed or bone-affixed) are to be used for registration, they are attached to the patient in the region of the anatomy to be imaged and registered. For a marker to be useful, it must be visible in the image acquired. Many types of markers, with different sizes, shapes and materials, are known in the art. For CT images, any material that attenuates radiation is potentially useful; metal spheres and hollow shapes filled with a solution containing iodine have commonly been used. For MR images, contrast agents that change the relaxation parameter of the hydrogen protons whose spins are imaged have commonly been used. For nuclear medicine scans (e.g., PET, SPECT) contrast agents are active radiation emitters. A bone-implanted marker system typically includes a post that is screwed into the bone, to which an imaging marker containing contrast agent is attached. The imaging marker is typically reversibly attached, and a different marker is attached to the post to acquire physical position information, as in step 107 to be described below.

At step 103, a three-dimensional image is acquired by a suitable technique such as CT, MR, PET or SPECT. At step 105, the geometric features to be used for registration are segmented; suitable techniques are known in the art. For example, if extrinsic markers are to be used, determine the centroid of each marker. If anatomical landmarks are to be used, identify the position of each landmark. If a surface is to be used, extract the surface. Surfaces such as the skin and bone can be easily and automatically extracted using published techniques.

At step 107, positional information is taken on the physical features corresponding to those segmented at step 105. Various techniques for doing so involve articulated mechanical probes, probes using electromagnetic, ultrasonic or optical radiation, stereo video cameras and laser range finders. A particularly useful technique will be explained below.

At step 109, weights are assigned to the segmented features to emphasize or deemphasize various features. For example, if data from bone are considered to be more accurate than data from skin, bone can be assigned a large weight, while skin can be assigned a small weight. Techniques for assigning weights will be described in detail below.

At step 111, the image taken at step 103 is registered with the physical positional information taken at step 107 by use of the weights assigned at step 109. The technique used is the weighted geometrical feature (WGF) algorithm, which will be described in detail below.

Illustrative examples of the physical features to be registered at step 111 include the following: exactly one marker plus other shapes or features; exactly two markers plus other shapes or features; exactly three markers where the markers are weighted differently; four or more markers where the markers are weighted differently; three or more anatomical landmarks weighted differently; three or more markers plus other shapes or features; exactly one surface with points which are weighted differently. In particular, one or two bone-implanted markers plus a surface should prove useful in many applications, as should differently weighted landmarks.

The output of step 111 is a transformation that maps each point in the 3-D image to a physical point. That transformation can be used at step 113 for a variety of surgical and other tasks, such as tracking the changing position of a surgical probe on a display of the preoperative images, or directing a needle (stereotactic biopsy) or energy (stereotactic radiosurgery) to a surgical target (e.g., tumor) located in the images.

The positional information can be acquired at step 107 using a technique which will now be explained with reference to FIGS. 2A, 2B and 3A–3C.

Intraoperatively, the head is fixed in a Mayfield clamp, physical-space markers are attached to the marker posts, a localization probe is calibrated, and the markers are localized. The localization probe is equipped with an array of infrared emitting diodes (IREDs). Physical space tracking of the probe is accomplished with optical triangulation using an Optotrak 3020 (Northern Digital, Ontario, Canada). The physical-space markers are manufactured with a hemispherical divot whose center corresponds to the centroid of the image markers. The tip of the probe is a spherical ball. Intraoperative localization of each marker is performed by placing the ball-point tip into the divot and pressing a button on the probe handle.

The ACUSTAR I Advanced Neurosurgical Navigation System registers images to each other and to the intraoperative physical coordinate system. When the localizer tip is placed near or within the patient, triplanar reformatted images intersecting at the corresponding position in image coordinates are generated. The ACUSTAR system used in the preferred embodiment has been enhanced so that it can also record selected probe tip positions after registration is performed. Several currently available systems can be relatively easily modified to implement the present invention; they feature tracking of some sort (optical, electromagnetic, or articulated mechanical), and they use a registration transformation to perform a surgical task.

Figure 2A:
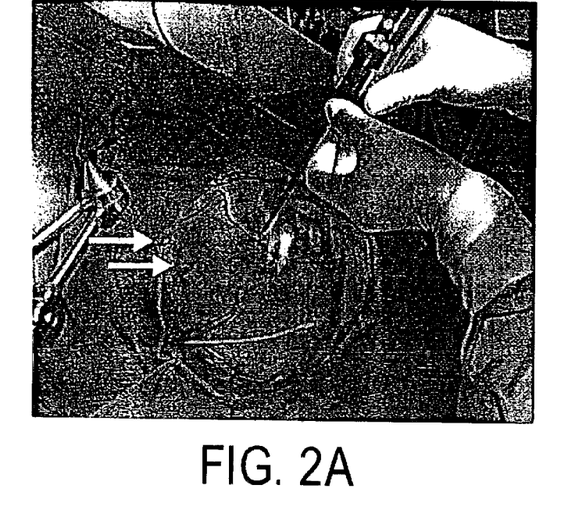
FIGS. 2A and 2B show the collection of point locations on the skin surface and the bone surface, respectively, of a patient about to undergo a craniotomy.
Figure 2B:
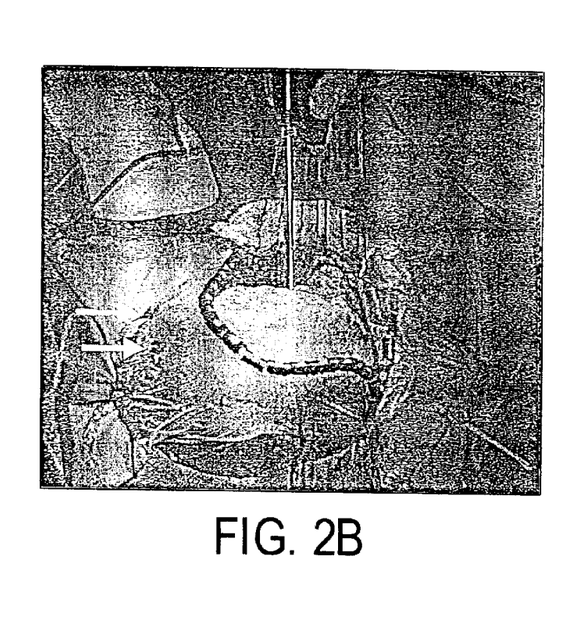
Figure 3A:
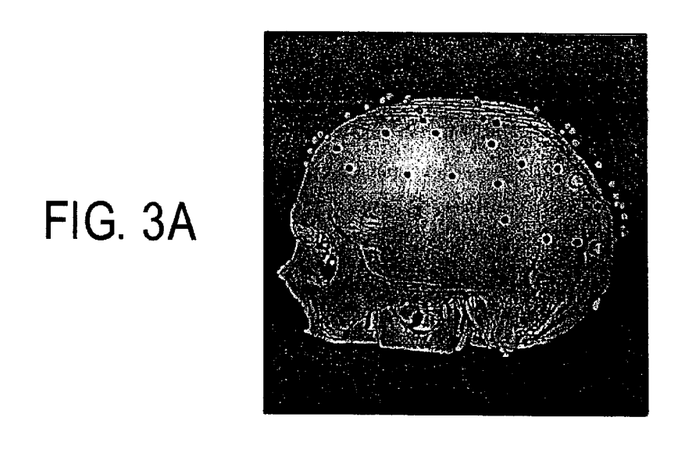
FIGS. 3A and 3B show renderings of a patient's skull showing a distribution of skin surface points.
Figure 3B:
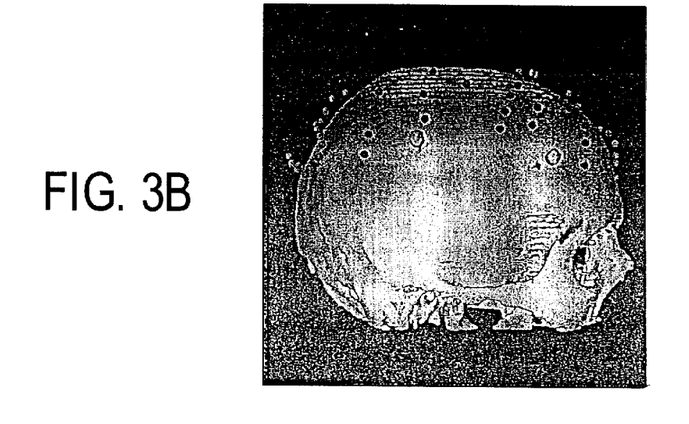
Figure 3C:
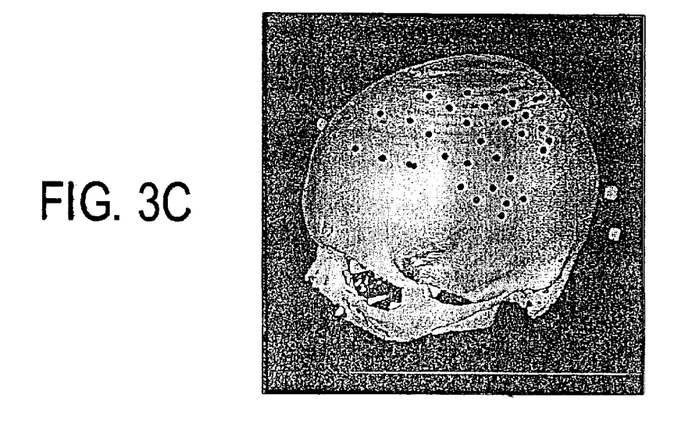
FIG. 3C shows a rendering of the same patient's skull as in FIGS. 3A and 3B showing a distribution of bone surface points.

To collect a skin point, the surgeon places the probe tip on the surface and records its 3-D coordinates by pressing a button. FIG. 2A shows such an operation for the collection of a point on the skin surface, while FIG. 2B shows such an operation for the collection of a point on a bone surface. The probe is supported by both hands to help prevent it from compressing the skin. The arrows in FIGS. 2A and 2B indicate two physical-space markers. During the acquisition of skin points, the probe is supported by both hands to help prevent the probe tip from compressing the skin. It takes two or three seconds to acquire each point. The user typically collects between 200 and 250 points for each skin surface acquisition and between 75 and 100 points for each bone surface. It is preferable to collect surface points as uniformly distributed over the head (skin points) and exposed skull (bone points) as possible. FIGS. 3A and 3B illustrate a typical distribution of recorded skin positions, while FIG. 3C illustrates a typical distribution of recorded bone positions. The skin points shown in FIGS. 3A and 3B are widely distributed over the top portion of the head, while the bone points are concentrated exclusively under the skin flap. Only one-third of the points are shown in each rendering. The markers are also visible (four in this case, although none, one, two, three, or any other suitable number could be used). The radius of the ball-point tip used for surface point collection is 0.75 mm.

The localization probe is calibrated by placing the ball-point tip in a hemispherical divot and pivoting the probe about the center of the divot. The position of the probe tip relative to the coordinate system of the probe (the probe coordinate system is set by the positions of infrared-emitting diodes on the probe handle) is determined by finding the most invariant point (in a least squares sense) in those pivot motions. That invariant point is the center of the ball-point tip. That is, the ball-point tip pivots about the center of the ball rather than a point on the surface of the ball.

To understand the assignment of weights of step 109 and the registration of step 111, one must first understand the goal of the registration algorithm and the notation in which the goal is expressed. The weighted geometrical feature (WGF) registration algorithm is an extension of the iterative closest point (ICP) algorithm taught in P. J. Best et al, "A method for registration of 3-D shapes," *IEEE Trans. Pattern Anal. Machine Intell.*, Vol. 14, pp. 239–256, 1992. Let $\{\rho_i\}$ for $i=1, \ldots, N_s$ be a set of "data" shapes in the physical data taken from the patient; the "data" shapes are to be registered with another set of "model" shapes $\{\chi_i\}$ in the image for $i=1, \ldots, N_s$. Each shape $\rho_i$ is decomposed into a point set $P_i=\{p_{ij}\}$ for $j=1, \ldots, N_{\rho i}$ if it is not already in point set form. For example, the points to be used for triangle sets are the vertices. Let $\{w_{ij}\}$ be a set of nonnegative weights associated with the points $\{p_{ij}\}$. The weights can be selected at step 109 in a variety of ways to emphasize or deemphasize various geometrical features; some techniques will be explained below. The goal of the algorithm is to find the rigid-body transformation $\Gamma$ that minimizes the cost function $$d(\mathcal{T}) = \sqrt{\sum_{i=1}^{N_S} \sum_{j=1}^{N_{Pi}} w_{ij} \| y_{ij} - \mathcal{T}(p_{ij}) \|^2}$$

where $$y_{ij} = \partial_i(\Gamma(p_{ij}), \chi_i)$$

and $\partial_i$ is a "correspondence" function. For the WGF registration algorithm, $\partial_i$ is defined to be the closest point operator; that is, $\partial_i$ finds the point $y_{ij}$ in the shape $\chi_i$ that is closest to the point $\Gamma(p_{ij})$. A multidimensional binary search tree can be used to speed up the search process, as is known in the art.

The weights $w_{ij}$ can be selected thus. Let $\{u_i\}$ for $i=1, \ldots, N_s$ be a non-negative set of inter-shape weights. Let $\{v_{ij}\}$ for $j=1, \ldots, N_{\rho i}$ be non-negative normalized sets of intra-shape weights. The weights are given by $w_{ij}=u_i v_{ij}$. The intra-shape weights can be set to be equal within each shape, so that all points within each shape are weighted equally, by setting $v_{ij}=1/N_{\rho i}$. The inter-shape weights $u_i$ can be selected to emphasize one feature over another. If it is not clear how much emphasis each feature should receive, the $u_i$ can be varied until an error curve reaches a minimum, as will be explained below when the experimental results are presented.

Figure 4:
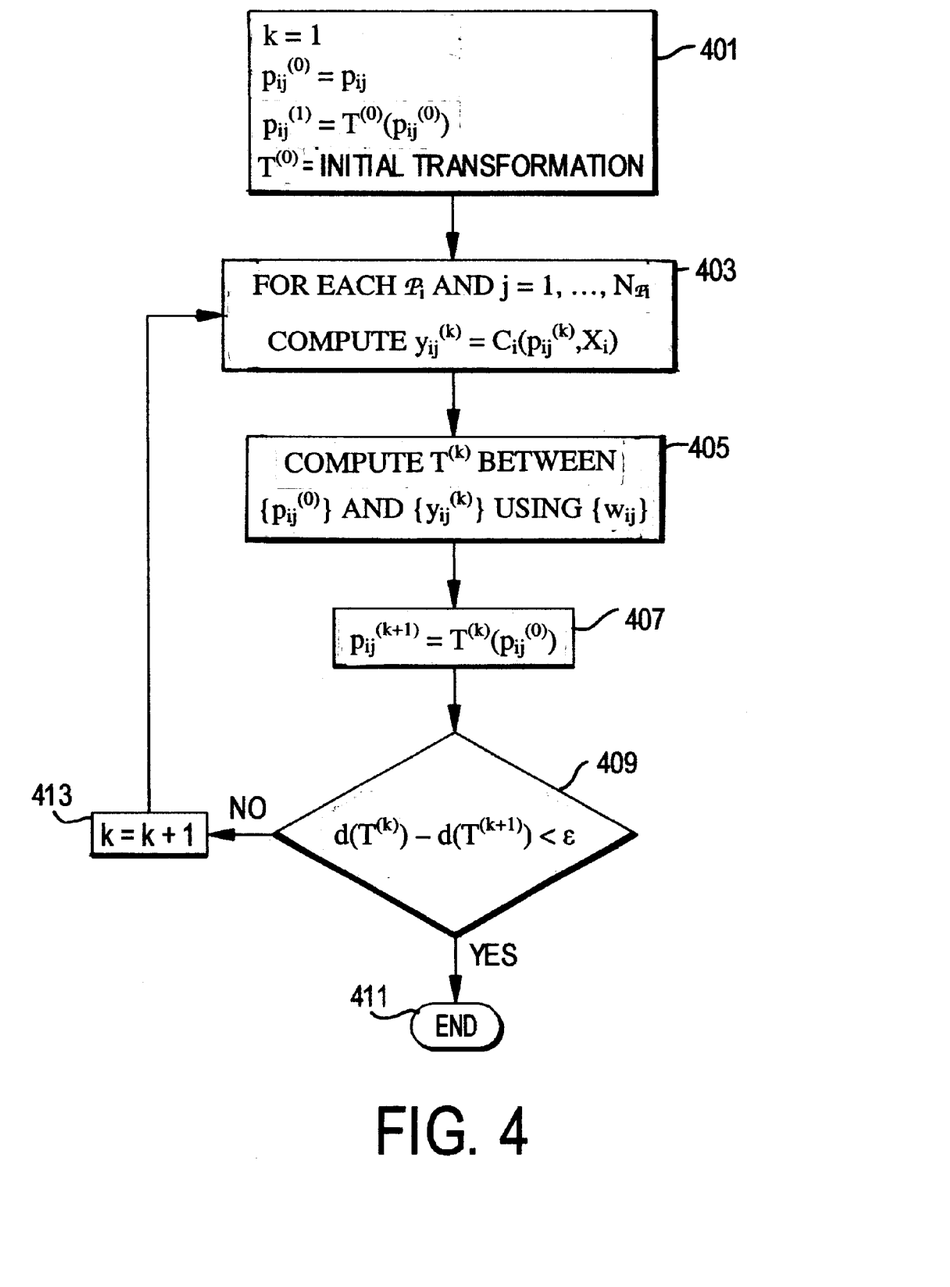
FIG. 4 shows a flow chart of a weighted geometrical features (WGF) algorithm used in the operations of FIG. 1.

The WGF algorithm is an iterative procedure which will now be explained with reference to FIG. 4. The procedure is initialized at step 401 by setting k=1, $p_{ij0}=p_{ij}$ and $p_{ij1}=\Gamma_0(p_{ij0})$ where $\Gamma_0$ is some initial transformation. The variable k and the third subscript on each p are iteration indices. The algorithm can be repeated with multiple initial transformations $\Gamma_0$ to solve the problem of local minima, or in other words to correct for a situation in which an iteration arrives at a local minimum which is different from the global minimum.

The following steps are carried out iteratively.

At step 403, for each shape $\rho_i$ and for $j=1, \ldots, N_{\rho i}$, the closest points $y_{ijk}=\partial_i(p_{ijk}, \chi_i)$ are calculated.

At step 405, the transformation $\Gamma_k$ is computed between the points $\{p_{ij0}\}$ and $\{y_{ijk}\}$ using the weights $\{w_{ij}\}$. In step 405, the points $\{p_{ij0}\}$ and $\{y_{ijk}\}$ for all shapes are collectively considered as two corresponding point sets and registered using an extension of the closed-form solution to the "orthogonal Procrustes" problem developed in K. S. Arun et al, "Least-square fitting of two 3-D point sets," *IEEE Trans. Pattern Anal. Machine Intell.*, Vol. 9, pp. 698–700, 1987. That extension allows the points to be weighted and is detailed in the above-referenced Maurer et al 1996 publication, which has already been incorporated by reference. That extension works in the following manner:

1) Translate the point sets such that their new origins are their previous weighted centroids $\bar{p}$ and $\bar{x}$ and denote the translated points with prime marks:

$$p'_{ij}=p_{ij}-\bar{p};\ x'_{ij}=x_{ij}-\bar{x}$$

where $$\bar{p} = \sum_{j=1}^{N_{pi}} w_{ij}p_{ij} \Big/ \sum_{j=1}^{N_{pi}} w_{ij}; \quad \bar{x} = \sum_{j=1}^{N_{pi}} w_{ij}x_{ij} \Big/ \sum_{j=1}^{N_{pi}} w_{ij}$$

2) Calculate the 3×3 weighted covariance matrix of the position vectors:

$$H = \sum_{j=1}^{N_{pi}} w_{ij} p'_{ij} x'^t_{ij}$$

where $^t$ represents a transposition of a matrix.

3) Calculate the SVD of the weighted covariance matrix:

$$H=U\Lambda V^t$$

4) Calculate the rotation matrix:

$$R=VU^t$$

If the determinant of R is +1, then R is the rotation matrix. If the determinant of R is −1, then the solution is a reflection rather than a rotation. In that case, V' is obtained from V by changing the sign of the column of V corresponding to the most singular value of H, and the rotation matrix is given by $$R=V'U^t$$

5) Calculate the translation vector $$t=\bar{x}-R\bar{p}$$

At step 407, the transformation $\Gamma_k$ found at step 405 is applied to produce registered points $p_{ij,k+1}=\Gamma_k(p_{ij0})$.

At step 409, the cost function $d(\Gamma)$ defined above is computed for $\Gamma_k$ and $\Gamma_{k+1}$, and it is determined whether $d(\Gamma_k)-d(\Gamma_{k+1})<\epsilon$, where $\epsilon$ is a predetermined tolerance. In other words, it is determined whether the iterative algorithm has converged to within $\epsilon$. If so, the algorithm ends with step 411. Otherwise, k is incremented by one at step 413, and another iteration begins with step 403.

In practice, however, one modification needs to be made to the algorithm just set forth. If a conventional localization probe having a spherical ball at its tip is used to locate the intraoperative skin and bone surface points, those points as measured are the positions of the center of the spherical ball. Hence the recorded surface points $p_{ij}$ are displaced from the actual surface $\chi_i$ by the radius $r_i$ of the ball-point tip. That is true for any orientation of the localization probe relative to the surface normal at the point of contact. The goal is thus to find the rigid-body transformation that minimizes the cost function $$d(\mathcal{T}) = \sqrt{\sum_{i=1}^{N_S} \sum_{j=1}^{N_{pi}} w_{ij}(\|y_{ij}-\mathcal{T}(p_{ij})\|-r_i)^2}$$

Accordingly, step 403 is modified such that if the shape $\rho_i$ is a surface, the closest points are computed as $$y_{ijk} = \mathcal{C}_i(\mathcal{T}(p_{ijk}),X_i) \pm r_i \frac{p_{ijk}-\mathcal{C}_i(p_{ijk},X_i)}{\|p_{ijk}-\mathcal{C}_i(p_{ijk},X_i)\|}$$

The last term is added if the point $p_{ijk}$ lies outside the surface $\chi_i$. Otherwise, it is subtracted. The algorithm thus fits the recorded surface points $p_{ij}$ to a surface that is displaced from the actual surface $\chi_i$ by the radius $r_i$ of the ball-point tip. If the± is replaced by a+, the algorithm can fit recorded surface points to either a surface that is displaced outside the actual surface (the correct solution) or one that is displaced inside the actual surface (a false solution). The± forces the algorithm to fit the recorded surface points to a surface that is displaced outside the actual surface. The false solution always has a higher residual error than that of the correct solution, i.e., it is never the global minimum. Use of the± prevents the iterative search from terminating in the local minimum corresponding to the false solution.

The present invention has been tested with data acquired from twelve patients that underwent craniotomies for the resection of cerebral lesions at Vanderbilt University Medical Center. All of the cases were temporal, front-temporal, or temporal-parietal lobe tumors. The patients were operated on in the supine position with the head oriented 90 degrees right or left (for the left and right tumors, respectively). The surgeries were performed using the ACUSTAR I Advanced Neurosurgical Navigation System which is used to provide intraoperative guidance during neurosurgery. Before the patient is imaged, the surgeon implants four plastic posts into the outer table of the skull of the patient with one end remaining outside the skin. The specific locations of the posts were determined by individual clinical circumstances, but generally the posts were widely separated and placed on both sides of the head, with two of the markers inferior and two superior to the region of surgical interest. Image markers that contain contrast fluid and generate high intensity in both X-ray computed tomography (CT) and magnetic resonance (MR) scans are attached to the posts just prior to image acquisition.

CT images were acquired preoperatively for all patients. Imaging studies were performed the day before or the morning of the surgical procedure. The CT images were acquired using a Siemens Somatom Plus scanner. Each image volume contains between 41 and 48 transverse slices with 512×512 pixels. The voxel dimensions are typically 0.4×0.4×3.0 mm. All CT image volumes in the present example are stacks of image slices with no interslice gap or slice overlap. The gantry tilt angle was zero.

The position of an image marker is defined as its centroid, which can be determined through known techniques. Triangle set representations of the skin and skull surfaces are automatically extracted from each CT image using a known tetrahedral decomposition method. That algorithm produces an oriented surface.

One measure of the accuracy of point-based and surface-based registrations is the value of the cost function at its minimum. A more clinically meaningful measure of registration accuracy is the distance between corresponding points other than those used to estimate the transformation parameters. Because such points might represent surgically targeted lesions, such points are called targets, and the corresponding accuracy measure is called a target registration error (TRE). The term "registration error," without a modifier, will be understood to mean the TRE.

The registration error of a transformation being evaluated is calculated by using as a reference gold standard the transformation obtained using three of the four bone-implanted markers; the remaining marker is used in the various combinations. Specifically, TRE is calculated as the distance between the position of a point in CT mapped from physical space by the reference transformation and its position mapped by the transformation being evaluated. Let x be the position of a target point in physical space. Let $R_1$ and $t_1$ be the rotation matrix and translation vector, respectively, of the reference rigid-body transformation $\Gamma_1$ that maps coordinates in physical space to CT. Let $R_2$ and $t_2$ be the rotation matrix and translation vector, respectively, of the evaluated rigid-body transformation $\Gamma_2$. Thus, $$y_1 = \Gamma_1(x) = R_1(x) + t_1$$

and $$y_2 = \Gamma_2(x) = R_2(x) + t_2$$

are the positions of the target point in CT mapped by the reference and evaluated transformations, respectively. The equation for $y_1$ is inverted to obtain $$x = R_1^{-1}(y_1) - R_1^{-1}(t_1)$$

which can be plugged into the equation for $y_2$ to obtain $$y_2 = R_2 R_1^{-1} y_1 + t_2 - R_2 R_1^{-1} t_1$$

The target registration error (TRE) $\Delta y$ is thus $$\Delta y = y_2 - y_1 = (R_2 R_1^{-1} - I) y_1 + t_2 - R_2 R_1^{-1} t_1$$

or $$\Delta y = (R_{12} - I) y_1 + \Delta t$$

where $R_{12} = R_2 R_1^{-1}$, I is identity and $\Delta t = t_2 - R_{12} t_1$. Since $R_1$ is an orthogonal matrix, $R_1^{-1}$ is equal to the transposition of $R_1$, or $R_1{}^t$.

The TRE at a given position is generally defined as $\|\Delta y\|$. For the purposes of the present invention, the TRE is computed as the mean value of $\|\Delta y\|$ at the center of every CT voxel inside the head that is within 75 mm of the center of the craniotomy. The center of the craniotomy is estimated as the centroid of the recorded bone surface points.

The reference gold standard is obtained by using three of the four bone-implanted markers. The accuracy of the reference transformation is estimated as follows. Consider a set of fiducial points that is registered to another set of points that differs from the first set by position, orientation, and noise that is added to each point (identical, independent, zero-mean, isotropic, normally distributed noise). Let $\sigma^2$ be the variance of the random noise. In the present case the random noise represents the error of determining the positions of the markers, and $\sigma$ is called the fiducial localization error (FLE). The root-mean-square (RMS) distance between fiducial points after registration is called the fiducial registration error (FRE). It can be shown using perturbation theory that if the points are registered in a least-squares sense using a rigid-body transformation, there is a statistical relationship among the expected value of FRE, FLE, and the number of fiducials N that is described by $$\langle FRE^2 \rangle \approx \frac{N-2}{N} \langle FLE^2 \rangle$$

where the brackets denote the expected value. We note that the expected value of FRE is independent of the fiducial configuration. It has been shown using perturbation theory that there is a relationship among the expected value of TRE, FLE, the number of fiducials N, the configuration of the fiducials, and the position of the target point relative to the fiducials that is described by $$\langle TRE^2(r) \rangle \approx \frac{\langle FLE^2 \rangle}{N} \left( 1 + \frac{1}{3} \sum_{k=1}^{3} \frac{d_k^2}{f_k^2} \right)$$

where $d_k$ is the distance of the target point r from the kth principal axis of the fiducial point set, and $f_k$ is the RMS distance of the fiducials from the kth axis, or in other words, effectively the radius of gyration of the fiducial set about its kth principal axis. We can estimate TRE from FRE by rearranging those two equations to eliminate FLE and thus obtain CT images are registered to physical space using the skin surface only, the bone surface only, and various weighted combinations of those surfaces and one bone-implanted marker position. Different weighted combinations are obtained by varying the inter-shape weights $u_j$. The marker closest to the craniotomy is the one used. The recorded physical space surface points and marker position are selected as the "data" shapes, and the CT extracted triangle set surfaces and localized marker position are selected as the "model" shapes.

An initial transformation can be determined by manually identifying three or more anatomic landmarks in the image and recording their approximate positions in physical space using the localization probe. The intraoperative positions were not recorded for any anatomic landmarks. However, that approach can be simulated as follows. 1) Identify the tip of the nose and the left and right tragi in the CT image. 2) Calculate the positions of those anatomic landmarks in physical space using the reference gold-standard transformation. 3) Perturb the physical space positions by adding random noise to each point (zero-mean, isotropic, normally distributed noise with a standard deviation of 10 mm). 4) Calculate a point-based registration using the identified image positions and the perturbed physical space positions. 5) Use the resulting approximate transformation as the initial transformation. That initial transformation typically differs from the reference transformation by a rotation on the order of 5 degrees and a translation on the order of 5 mm.

Surface points that are incorrectly segmented or that lie on a non-overlapping surface can adversely affect registration accuracy. The outlier problem can be corrected as follows. The WGF algorithm is permitted to iterate until it converges within a tolerance $\epsilon = 5 \times 10^{-5}$ mm. Outliers are arbitrarily defined as points whose distance from the closest corresponding surface point after that first pass is greater than the mean distance plus two standard deviations. The intra-shape weight $v_{ij}$ corresponding to each outlier is set equal to 0, the intra-shape weight sets $\{v_{ij}\}$ are renormalized for each i, the weights $w_{ij}$, are recomputed, and the WGF algorithm is reapplied.

All results in the present disclosure are based on retrospective analysis of preoperative images and intraoperative measurements. Transformations calculated using the WGF algorithm were not used for intraoperative navigation.

Figure 5:
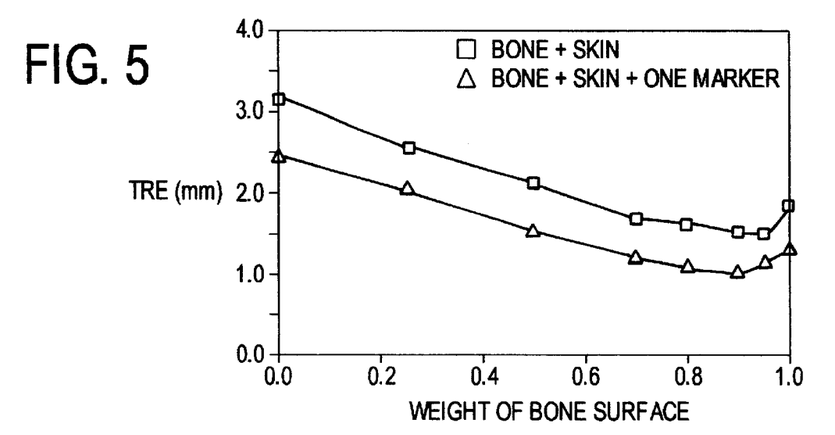
FIGS. 5–7 show experimental results obtained from the WGF algorithm of FIG. 4.
Figure 6:
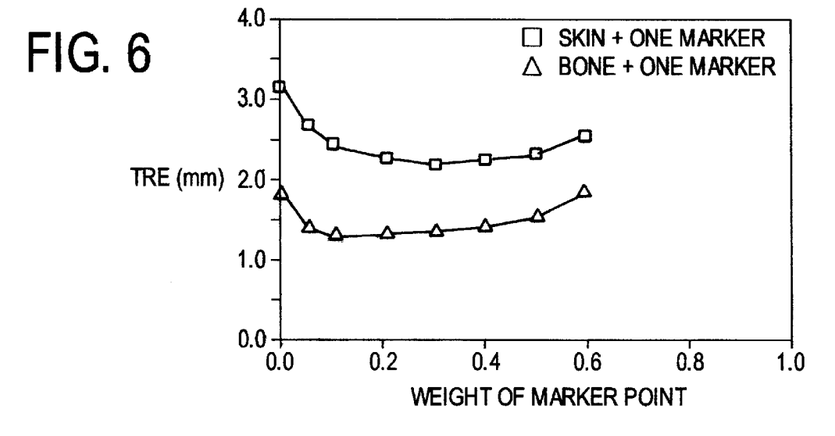

CT images were registered to physical space using various weighted combinations of the skin surface, bone surface, and one bone-implanted marker. Different weighted combinations were obtained by varying the inter-shape weights $u_i$. The mean TRE values computed using the resulting transformations are illustrated in FIGS. 5 and 6. Each symbol in those figures represents the mean TRE obtained from twelve patients. The skin, bone, and marker inter-shape weights are distinguished with the subscripts s, b, and m, respectively. In FIG. 5, $u_s+u_b=1.0$ for all registrations. The marker weight $u_m$ is 0.0 for the top curve (i.e., the marker is not used) and 0.1 for the bottom curve. The square symbols on the left and right axes represent skin only and bone only surface-based registrations, respectively. The square symbols between the axes represent skin-and-bone surface-based registrations. The triangle symbols on the left and right axes represent skin-and-marker and bone-and-marker registrations, respectively. The triangle symbols between the axes represent skin-bone-and-marker registrations. The skin-and-bone registration curve has a minimum at $u_s=0.05$, $u_b=0.95$. The skin-bone-and-marker registration curve has a minimum at $u_s=0.10$, $u_b=0.90$. In FIG. 6, $u_s+u_m=1.0$ for the top curve ($u_b=0.0$, i.e., the bone-surface is not used), and $u_b+u_m=1.0$ for the bottom curve ($u_s=0.0$, i.e., the skin-surface is not used). The skin-and-marker registration curve has a minimum at $u_s=0.70$, $u_m=0.30$. The bone-and-marker registration curve has a minimum at $u_b=0.90$, $u_m=0.10$. Both of those curves are fairly flat between $u_m=0.1$ and 0.4. Therefore, FIG. 5 presents results using only a single value of $u_m$ for the skin-bone-and-marker registrations (bottom curve). Curves obtained using other values of $u_m$ between 0.1 and 0.4 give very similar results. Several of the interesting findings are listed in Table 1, in which "SD" stands for "standard deviation":

| Type of Registration | TRE (mm) | |
|---|---|---|
| | mean ± SD | 95% |
| Skin surface only | 3.1 ± 1.4 | 5.5 |
| Skin surface + 1 marker | 2.2 ± 1.0 | 3.8 |
| Bone surface only | 1.8 ± 0.8 | 3.1 |
| Bone surface + 1 marker | 1.3 ± 0.5 | 2.1 |
| Skin + bone surfaces | 1.5 ± 0.6 | 2.5 |
| Skin + bone surfaces + 1 marker | 1.0 ± 0.3 | 1.5 |

In Table 1, for the registrations performed using multiple geometrical features, the TRE values correspond to the minima for the four curves in FIGS. 5 and 6. The 95% TRE values are calculated as mean+1.645 SD by assuming that the TRE values are normally distributed.

Those results were obtained using 211±13 (mean±standard deviation) skin points and 83±8 bone points. Of those, 11±5 skin points and 3±2 bone points were classified as outliers and discarded as described above. Visual inspection revealed that about half of the skin outliers are located at the very top of the head in patients whose CT scan does not include the top several millimeters of the head. The remaining skin outliers, and all of the bone outliers, are surface points whose recorded positions are located at least 5 mm outside the corresponding surface and thus probably represent erroneous "air clicks," i.e., points that were recorded while the probe tip was not touching the skin or bone surface.

Figure 7:
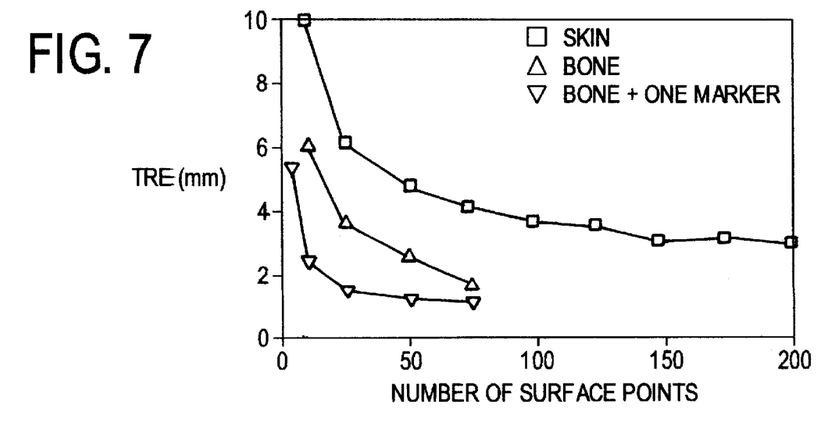

The effect of the number of surface points on registration accuracy was also investigated. The results are shown in FIG. 7. The curves were generated by performing each registration with a randomly picked subset of the total number of surface points.

The mean FRE for the reference gold standards, i.e., the registrations obtained using three bone-implanted markers, is 0.28 mm. TRE was estimated for the reference transformations for each patient with that value of FRE. The reference TRE computed for the twelve patients is 0.67±0.10 mm (mean±standard deviation; range=0.57 to 0.85 mm).

It is intuitively clear that a combination of geometrical features might improve registration accuracy. However, it is also intuitively clear that a combination of features might merely produce a registration with intermediate accuracy. Using multiple geometrical features simultaneously can improve the accuracy of CT-to-MR registration. Specifically, the registration of head CT and MR image volumes using points and a surface can be significantly more accurate than registration using only points or a surface. A combination of geometrical features can also improve the accuracy of CT-to-physical registration. The improvement in accuracy obtained for CT-to-physical registration is relatively larger than that obtained for CT-to-MR registration. If the registration error of an evaluated registration technique is approximately the same as that of the reference gold standard, and if the errors are independent, then the observed TRE of the evaluated technique will be approximately $\sqrt{2}$ times the TRE of the reference standard. In the examples set forth above, the TRE of the reference standard is approximately 0.67 mm. We note that $\sqrt{2}\times0.67=0.95$ mm. The best observed TRE found in the present example is 1.02 mm and was obtained using the skin surface, the bone surface, and one bone-implanted marker (see FIG. 5 and Table 1). Thus it is likely that the accuracy of the hybrid registration is comparable to that of the reference gold standard.

A combination of geometrical features can reduce not only the mean TRE but also the standard deviation and thus can improve not only registration accuracy but also reproducibility. Table 1 lists 95% TRE values that were calculated as mean+1.645 SD by assuming that the TRE values are normally distributed. The 95% TRE values are an estimate of the worst TRE that will be observed in 95 out of 100 registrations. For example, the bone surface-based mean TRE improved 0.5 mm—from 1.8 to 1.3 mm—by also using one marker. The 95% TRE improved 1.0 mm, from 3.1 to 2.1 mm.

One feature of the present invention is that a registration can be achieved using only one or two points. Point-based registration requires a minimum of three noncolinear points. The position of a bone-implanted marker can be determined much more accurately than that of a skin-affixed marker or an anatomic landmark. The major disadvantage of using bone-implanted markers is that an invasive procedure is required to implant each marker. By combining surface information, the WGF algorithm allows registration to be performed using only one or two such markers. For example, a robot-assisted total hip replacement system (ROBODOC Surgical Assistant System, Integrated.Surgical Systems, Inc., Sacramento, Calif.) performs IP registration using three titanium pins, one implanted into the greater trochanter and two implanted into the condyles of the patient's femur. Implantation of the two markers in the condyles can be painful and difficult. The WGF algorithm could potentially be applied in such a system to perform registration using a femur surface—determined, for example, using ultrasound—plus only one or two pins, thereby eliminating one or two pins. The accuracy and reproducibility of such an application would of course have to be carefully tested and validated.

One interesting finding is that the use of a single very accurate point (a bone-implanted marker) allows very accurate surface-based registration to be achieved using very few surface points. For example, an accuracy of 2.4±0.9 mm (mean±SD) was achieved with only 10 bone surface points by combining a single marker (see FIG. 7). That is rather remarkable given that all of our bone surface points are located within a relatively small surface patch and lie on an approximately spherical surface (see FIGS. 3A–3C). It is probable that even better accuracy can be achieved with so few bone surface points if they are collected over a larger area and in regions with greater curvature.

The WGF registration algorithm, which not only allows the combination of multiple types of geometrical information but also handles point-based and surface-based registration as degenerate cases, could form the foundation of a "flexible" surgical navigation system that allows the surgeon to use what he considers the method most appropriate for an individual clinical situation. For example, if a neurosurgeon wants to remove a superficial meningioma and decides that a 95% TRE of 5–6 mm is sufficient for his operation, he might choose to do a surface-based registration using the skin. If he decides that he needs additional accuracy, he might initially collect skin surface points, perform a skin surface-based registration, use that registration to make a skin flap, collect surface points over the skull that is exposed after making the skin flap, perform a bone-and-skin surface-based registration, and use that more accurate registration to elevate the craniotomy and perform surgery. The present invention would allow the surgeon to also use one or more anatomic landmarks and/or bone-implanted markers in a bone-skin-and-marker registration. In circumstances where the best possible accuracy is required, as may be the case for skull-base surgery performed using an operating microscope with video overlays containing information derived from preoperative images, three or more bone-implanted markers could be used, possibly in combination with the skull surface.

Figure 8:
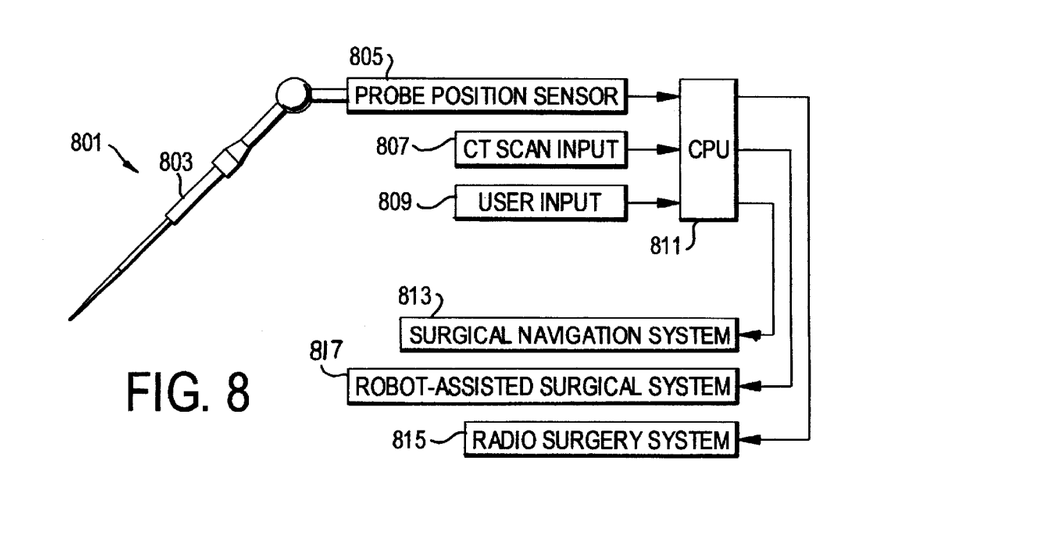
FIG. 8 shows a block diagram of an apparatus for carrying out the method according to the preferred embodiment.

FIG. 8 shows a block diagram of one possible apparatus for carrying out the method described above in the context of a surgical procedure. The components of the apparatus shown in FIG. 8 can be those set forth above, any equivalents, or any other suitable components, whether selected from the prior art or yet to be developed.

In the apparatus 801, a probe 803 such as that described above is used to take positional data. A probe sensor 805 detects the position of the probe each time positional data are taken. Scanning data such the data of a CT scan are input through a suitable input 807. The user can input information and commands, such as the desired weights of various points, through a user input 809 which can include a terminal with a keyboard or any other suitable user interface. The probe position sensor 805, the CT scan input 807 and the user input 809 supply their respective data to a central processing unit (CPU) 811, which can be any suitable computing device sufficiently powerful to carry out the WGF algorithm. The result of the WGF algorithm can be used in surgery in any suitable way; for example, it can be applied to a surgical navigation system 813 such as the ACUSTAR I system, a radiosurgery system 815 or a robot-assisted surgical system 817 such as the ROBODOC system.

While a preferred embodiment of the present invention has been set forth in detail above, those skilled in the art who have reviewed the present disclosure will readily appreciate that other embodiments can be realized within the scope of the present invention. For example, the particulars of the WGF algorithm can be refined as needed, and any suitable way of taking the physical positions can be used instead of, or in addition to, the probe. The cost function or the search technique could be adjusted. It is possible that other search techniques known in the art could produce good registration results. It is also possible that an alternative cost function, e.g., a cost function where the $L_2$ norm (sum of squared values) is replaced by the $L_1$ norm (sum of absolute values), could produce good registration results. Therefore, the present invention should be construed as limited only by the appended claims and by applicable principles of law.

What is claimed is:

1. A method of registering an image taken from a patient to a physical space in which the image is taken, the method comprising:
   (a) taking the image;
   (b) segmenting the image to obtain features of the image;
   (c) taking a plurality of measurements on the patient;
   (d) assigning weights to the features obtained in step (b), wherein not all of said weights are equal;
   (e) using the weights assigned in step (d), registering the features obtained in step (b) with the measurements taken in step (c) to obtain a transformation function; and
   (f) using the transformation function obtained in step (e), controlling a surgical procedure performed on the patient.

2. The method of claim 1, wherein step (d) comprises assigning the weights to the features in accordance with estimated measurement errors of the features such that the weights increase as the estimated measurement errors decrease.

3. The method of claim 2, wherein:
   the measurements define a plurality of shapes $\rho_i$, each shape $\rho_i$ of the plurality of shapes defining a point set $\{p_{ij}\}$; and
   each point $p_{ij}$ corresponds to a weight $w_{ij}=u_i v_{ij}$, where $u_i$ is a weight of said shape $\rho_i$ among said plurality of shapes and wherein $v_{ij}$ is a weight of said point $p_{ij}$ within said shape $\rho_i$.

4. The method of claim 3, wherein the measurements are taken from two or more of said shapes $\rho_i$, not all of said weights $u_i$ are equal, and for each i, all values of $v_{ij}$ are equal.

5. The method of claim 1, wherein:
   the measurements comprise measurements of a plurality of points $p_{ij}$;
   the features of the image comprise a plurality of shapes $\chi_i$; and
   step (e) comprises:
   (i) selecting an initial transformation $\Gamma_0$ and calculating $p_{ij1}=\Gamma_0(p_{ij})$;
   (ii) for an iteration index k, beginning with k=1, calculating $y_{ijk}$ as a closest point in $\chi_i$ to $p_{ijk}$ using a closest point operator, determining a transformation $\Gamma_k$ between $\{p_{ij}\}$ and $\{y_{ijk}\}$, and calculating $p_{ij,k+1}=\Gamma_k(p_{ijk})$;
   (iii) determining whether a cost function of $\Gamma_k$ has converged to within a predetermined tolerance;
   (iv) if the cost function has converged to within the predetermined tolerance, taking $\Gamma_k$ to be the transformation function of step (e); and
   (v) if the cost function has not converged to within the predetermined tolerance, incrementing k and carrying out steps (e)(ii) and (e)(iii) with the incremented k.

6. The method of claim 5, wherein at least some of the measurements are taken with a probe having a tip with a radius, and wherein the cost function and the closest point operator are corrected in accordance with the radius of the tip.

7. The method of claim 5, wherein step (e) further comprises selecting a plurality of initial transformations and carrying out steps (e)(i)–(e)(v) for each of the plurality of initial transformations to avoid finding a local minimum of the cost function.

8. The method of claim 1, wherein at least some of the measurements are taken by applying a hand-held probe to the patient and detecting locations of the hand-held probe.

9. The method of claim 8, wherein the measurements taken with the hand-held probe comprise measurements taken on the patient's skin.

10. The method of claim 9, wherein the measurements taken with the hand-held probe further comprise measurements taken on a bone surface of the patient.

11. The method of claim 10, wherein the bone surface is exposed by lifting a skin flap so that the measurements on the bone surface can be taken.

12. The method of claim 1, wherein the surgical procedure comprises navigating within the patient's body in accordance with the transformation function.

13. The method of claim 1, wherein the surgical procedure comprises directing radiation at a location within the patient's body determined in accordance with the transformation function.

14. The method of claim 1, wherein the surgical procedure comprises a robot-assisted surgical procedure controlled in accordance with the transformation function.

15. The method of claim 1, wherein, in step (c), at least one of the plurality of measurements is taken without affixing a marker or a frame to the patient.

16. The method of claim 1, wherein the measurements are taken from one marker affixed to the patient plus other shapes.

17. The method of claim 1, wherein the measurements are taken from two markers affixed to the patient plus other shapes.

18. The method of claim 1, wherein the measurements are taken from three markers affixed to the patient, and wherein step (d) comprises assigning different weights corresponding to the three markers.

19. The method of claim 1, wherein the measurements are taken from at least four markers affixed to the patient and wherein step (d) comprises assigning different weights corresponding to the four or more markers.

20. The method of claim 1, wherein the measurements are taken from at least three anatomical landmarks on the patient, and wherein step (d) comprises assigning different weights corresponding to the at least three anatomical landmarks.

21. The method of claim 1, wherein the measurements are taken from at least three markers affixed to the patient plus other shapes.

22. The method of claim 1, wherein the measurements are taken from a plurality of points on one surface, and wherein step (d) comprises assigning different weights corresponding to the plurality of points.

23. An apparatus for registering an image taken from a patient to a physical space in which the image is taken, the apparatus comprising:

image taking means for taking the image;

measurement taking means for taking a plurality of measurements on the patient;

processing means for segmenting the image to obtain features of the image, assigning weights to the features, wherein not all of said weights are equal, and using the weights to register the features with the measurements to obtain a transformation function; and surgical means for using the transformation function to control a surgical procedure performed on the patient.

24. The apparatus of claim 23, wherein the processing means comprises means for assigning the weights to the features in accordance with estimated measurement errors of the features such that the weights increase as the estimated measurement errors decrease.

25. The apparatus of claim 24, wherein:

the measurements define a plurality of shapes $\rho_i$, each shape $\rho_i$ of the plurality of shapes defining a point set $\{p_{ij}\}$; and each point $p_{ij}$ corresponds to a weight $w_{ij}=u_i v_{ij}$, where $u_i$ is a weight of said shape $\rho_i$ among said plurality of shapes and wherein $v_{ij}$ is a weight of said point $p_{ij}$ within said shape $\rho_i$.

26. The apparatus of claim 25, wherein the measurements are taken from two or more of said shapes $\rho_i$, not all of said weights $u_i$ are equal, and for each i, all values of $v_{ij}$ are equal.

27. The apparatus of claim 23, wherein:

the measurements comprise measurements of a plurality of points $p_{ij}$;

the features of the image comprise a plurality of shapes $\chi_i$; and the processing means comprises means for:

(i) selecting an initial transformation $\Gamma_0$ and calculating $p_{ij1}=\Gamma_0(p_{ij})$;

(ii) for an iteration index k, beginning with k=1, calculating $y_{ijk}$ as a closest point in $\chi_i$ to $p_{ijk}$ using a closest point operator, determining a transformation $\Gamma_k$ between $\{p_{ij}\}$ and $\{y_{ijk}\}$, and calculating $p_{ij,k+1}=\Gamma_k(p_{ijk})$;

(iii) determining whether a cost function of $\Gamma_k$ has converged to within a predetermined tolerance;

(iv) if the cost function has converged to within the predetermined tolerance, taking $\Gamma_k$ to be the transformation function of step (e); and (v) if the cost function has not converged to within the predetermined tolerance, incrementing k and carrying out steps (e)(ii) and (e)(iii) with the incremented k.

28. The apparatus of claim 27, wherein the measurement taking means comprises a probe having a tip with a radius, and wherein the cost function and the closest point operator are corrected in accordance with the radius of the tip.

29. The apparatus of claim 27, wherein the processing means comprises means for selecting a plurality of initial transformations and carrying out steps (i)–(v) for each of the plurality of initial transformations to avoid finding a local minimum of the cost function.

30. The apparatus of claim 23, wherein the surgical means comprises means for navigating within the patient's body in accordance with the transformation function.

31. The apparatus of claim 23, wherein the surgical means comprises means for directing radiation at a location within the patient's body determined in accordance with the transformation function.

32. The apparatus of claim 23, wherein the surgical means comprises a robot-assisted surgical device controlled in accordance with the transformation function.

* * * * *